United States Patent [19]

Smith et al.

[11] Patent Number: 5,841,840

[45] Date of Patent: Nov. 24, 1998

[54] MULTIPLE LINE MODEM AND METHOD FOR PROVIDING VOICE ON DEMAND

[75] Inventors: Richard K. Smith, Seminole; Thomas J. Bingel, Belleair Beach, both of Fla.

[73] Assignee: Paradyne Corporation, Largo, Fla.

[21] Appl. No.: 772,734

[22] Filed: Dec. 23, 1996

[51] Int. Cl.[6] .................................................. H04M 11/00

[52] U.S. Cl. ................................. 379/93.01; 379/93.05; 379/93.07; 379/93.08; 379/93.09

[58] Field of Search .............................. 379/93.07, 93.08, 379/93.09, 93.11, 100.15, 100.16, 100.17; 348/16, 17, 18; 370/353, 355, 433, 468, 528; 375/260

[56] References Cited

U.S. PATENT DOCUMENTS

| 4,596,021 | 6/1986 | Carter et al. | 375/5 |
| 4,862,456 | 8/1989 | Giorgio | 370/118 |
| 5,317,415 | 5/1994 | Kinami et al. | 358/425 |

*Primary Examiner*—Curtis A. Kuntz
*Assistant Examiner*—Melur Ramakrishnaiah
*Attorney, Agent, or Firm*—Thomas, Kayden, Horstemeyer & Risley, L.L.P.

[57] ABSTRACT

A multiple line modem and method enable a user to automatically usurp a plurality of telephone lines for data transfer when the telephone is not in use and the ability to switch from multiple line data operation to one (or more) line data and one (or more) line telephone operation automatically when the telephone handset is lifted or an incoming call is detected signaling a request for voice service. The multiple line modem will automatically reestablish the data connection on the line(s) that was used for voice service when the voice service terminates. The multiple line modem allows end to end service that is transparent to the central office. When all lines are operating in data transfer mode, the aggregate data transfer rate is multiplied by the number of lines available for data transport. When one line(s) is operating in voice service mode, the other line(s) maintains data transfer operation at a reduced rate. The line(s) that is used for voice service is adaptively managed by the multiple line modem to provide seamless switching between data transfer mode operation when voice service is not requested and voice service mode operation when voice service is requested.

17 Claims, 5 Drawing Sheets

MULTIPLE LINE MODEM AND METHOD FOR PROVIDING VOICE ON DEMAND

FIELD OF THE INVENTION

The present invention relates generally to electronic data communications and, more particularly, to a multiple line modulator/demodulator (modem) that allows multiple communication lines to be used for data transfer. One or more lines can be automatically made available for voice service, while maintaining the other line or lines in data service mode.

BACKGROUND OF THE INVENTION

A modem is a device for modulating and demodulating a digital signal for transmission along a communication line. A communication line can be an ordinary telephone connection. Modems typically are in use for transmitting data to and from a users home computer to an internet service provider, allowing access to the internet. With the popularity of the internet and the World Wide Web, many users are ordering two or more telephone lines, one for telephone use and one or more for data transfer using a modem. When the modem is not in use, it is convenient to use all lines for voice, but until now, there has been no way to use all lines for data when the telephone is not in use. Broadband internet access which allows connectivity at higher than conventional modem speeds of 33.6 kilobits per second (kbps) using methods such as Integrated Services Digital Network (ISDN) technology requires deployment of special equipment at the central office serving the home user. Because of this equipment requirement, ubiquitous broadband access is still a number of years in the future.

SUMMARY OF THE INVENTION

This invention provides for a multiple line modem and method for enabling a user to automatically usurp two or more telephone lines for data transfer when the telephone is not in use, and the ability to switch from multiple line data operation to one or more line data and one or more line telephone operation automatically when the telephone handset is lifted or an incoming call is detected signaling a request for voice service. The multiple line modem will automatically reestablish the data connection when the voice service terminates. No additional equipment at the central office is required. The present invention allows end to end service that is transparent to the central office. While the present invention is applicable to two or more communications lines, for simplicity, the inventive concept will be illustrated assuming that two lines are available. The present invention can function equally well with more than two lines. For example, in the case of three lines at a customer remote location, three lines can be used for data transfer until a request for voice service is detected at which time one of the lines is made available for voice service while the remaining two lines continue to operate in data transfer mode. Similarly, in multiple line applications, more than one line may be switched between data service mode and voice service mode, while all remaining lines continue to operate in data service mode.

When both lines are operating in data transfer mode, approximately twice the data transfer rate can be transported, thus almost doubling the speed of data transfer. For example, if three lines are available, the present invention can provide approximately triple the data transfer rate and so on. When the second line is operating in voice service mode, the first line maintains data transfer operation at a reduced rate.

The second line is adaptively managed by the multiple line modem to provide seamless switching between data transfer mode operation when voice service is not requested and voice service mode operation when voice service is requested.

The invention has numerous advantages, a few of which are delineated hereafter, as merely examples.

An advantage of the multiple line modem and method is that it allows a user to double the data transfer rate of a connection.

Another advantage of the multiple line modem and method is that it allows voice service on a second telephone line while maintaining uninterrupted data service on a first line. This is accomplished by adaptively switching between multiple line data transfer operation and one or more line data transfer operation and one line voice operation.

Another advantage of the multiple line modem is that it automatically restores multiple line data transfer operation when voice service is terminated.

Another advantage of the multiple line modem is that it is simple in design, reliable in operation, and easily implemented in mass for commercial production of modems.

Other objects, features, and advantages of the present invention will become apparent to one with skill in the art upon examination of the following drawings and detailed description. It is intended that all such additional objects, features, and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

A. ARCHITECTURE

1. Modem Components For Implementing A Data Transfer Mode

Figure 1:
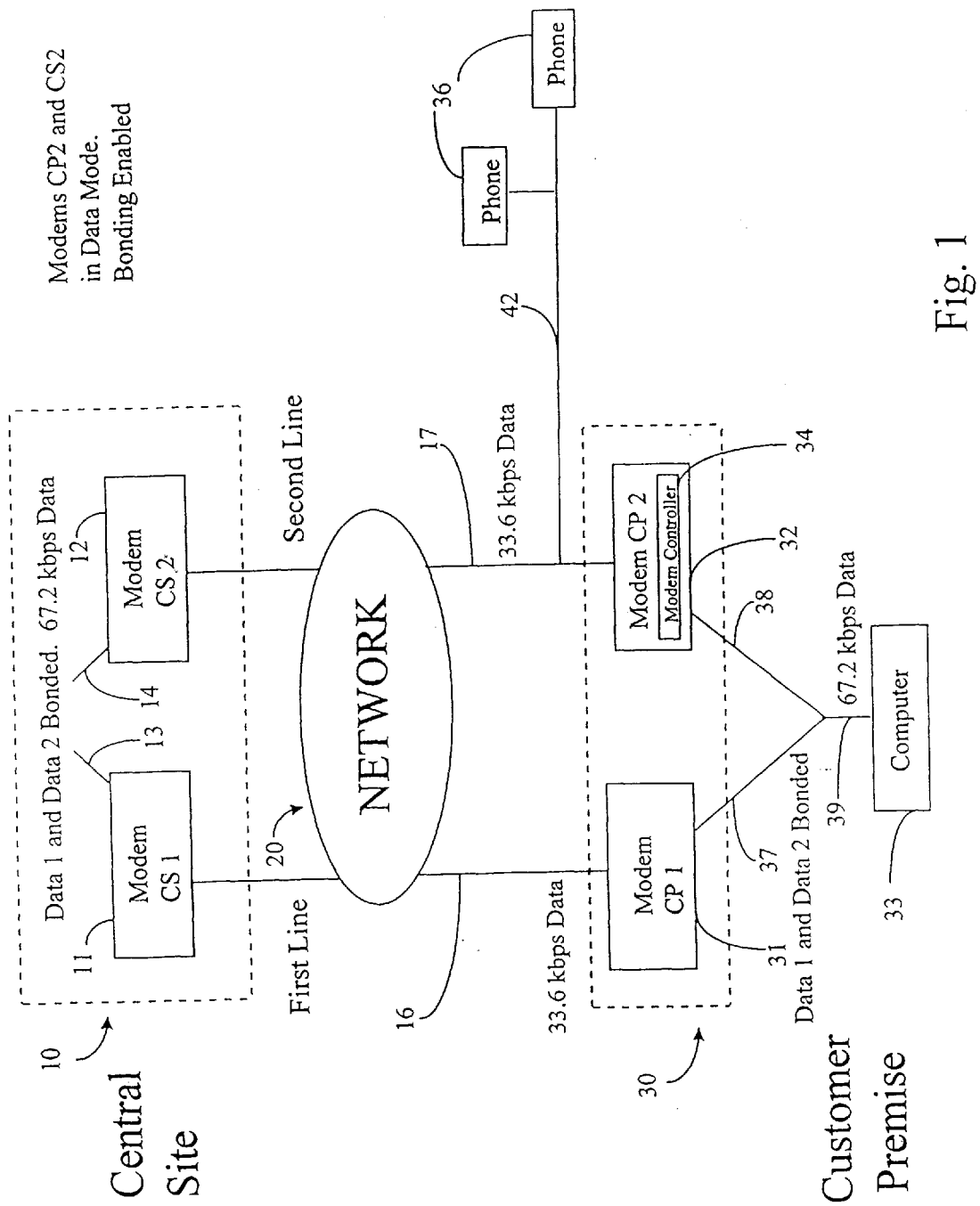
FIG. 1 is a schematic view of a multiple line modem and method of the present invention in a typical network configuration with both lines operating in data transfer mode.

FIG. 1 is a schematic view illustrating a multiple line modem and method of the present invention in a typical network connection between a central site and a customer premise, where both first line 16 and second line 17 are operating in data transfer mode. While first customer premise (CP) modem 31 and second customer premise (CP) modem 32 and first central site (CS) modem 11 and second central site (CS) modem 12 are depicted as distinct modems they can be implemented as integrated modems whereby customer premise modem 30 includes both first CP modem 31 and second CP modem 32 and central site modem 10 includes both first CS modem 11 and second CS modem 12.

Further note that the elements of the CP modem 30 and the elements of the CS modem 10, as described hereafter, can be implemented with respective software, firmware, hardware, or a combination thereof. In the preferred embodiment, the elements of the CP modem 30 as well as the CS modem 10 are implemented in software that is stored in a memory and that configures and drives a suitable digital signal processor engine (DSPE) situated in the respective modem. Furthermore, the foregoing software can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method.

First CS modem 11 is connected to first line 16 through network 20 to first CP modem 31. Network 20 can be any public network including but not limited to for example, a public switched telephone network (PSTN) or public data network (PDN). Second CS modem 12 is connected to second line 17 through network 20 to second CP modem 32. First line 16 and second line 17 each operate at a speed of approximately 33.6 kbps during data transfer operation. Modems 31 and 32 connect through lines 37 and 38 respectively, to form a bonded high speed data connection 39 operating at approximately 67.2 kbps serving computer 33. Bonding is a well known technique in which two data streams are combined into a single higher rate data stream. While a data stream is bonded, the present invention teaches a technique in which one data channel is dropped and made available for voice service, while allowing the other channel to continue data mode operation unaffected by the change in service of the other channel from data mode operation to voice mode operation and back to data mode operation. An example of a bonding specification that is known to one of ordinary skill in the art is PPP Multilink (RFC 1990). The bonding function can be accomplished in, among other places, the modem, the computer, or in an external device.

While operating in this high speed bonded data mode, both first line 16 and second line 17 are transporting data. Connected to second CP modem 32 through line 42 are residential telephones 36. Within second CP modem 32 resides modem controller 34 which provides the adaptive switching capability that enables the modem to switch second line 17 between data transfer mode and voice transfer mode. Modem controller 34 will be discussed in detail in the section entitled Modem Controller.

2. Modem Components For Implementing A Combined Data and Voice Transfer Mode

Figure 2:
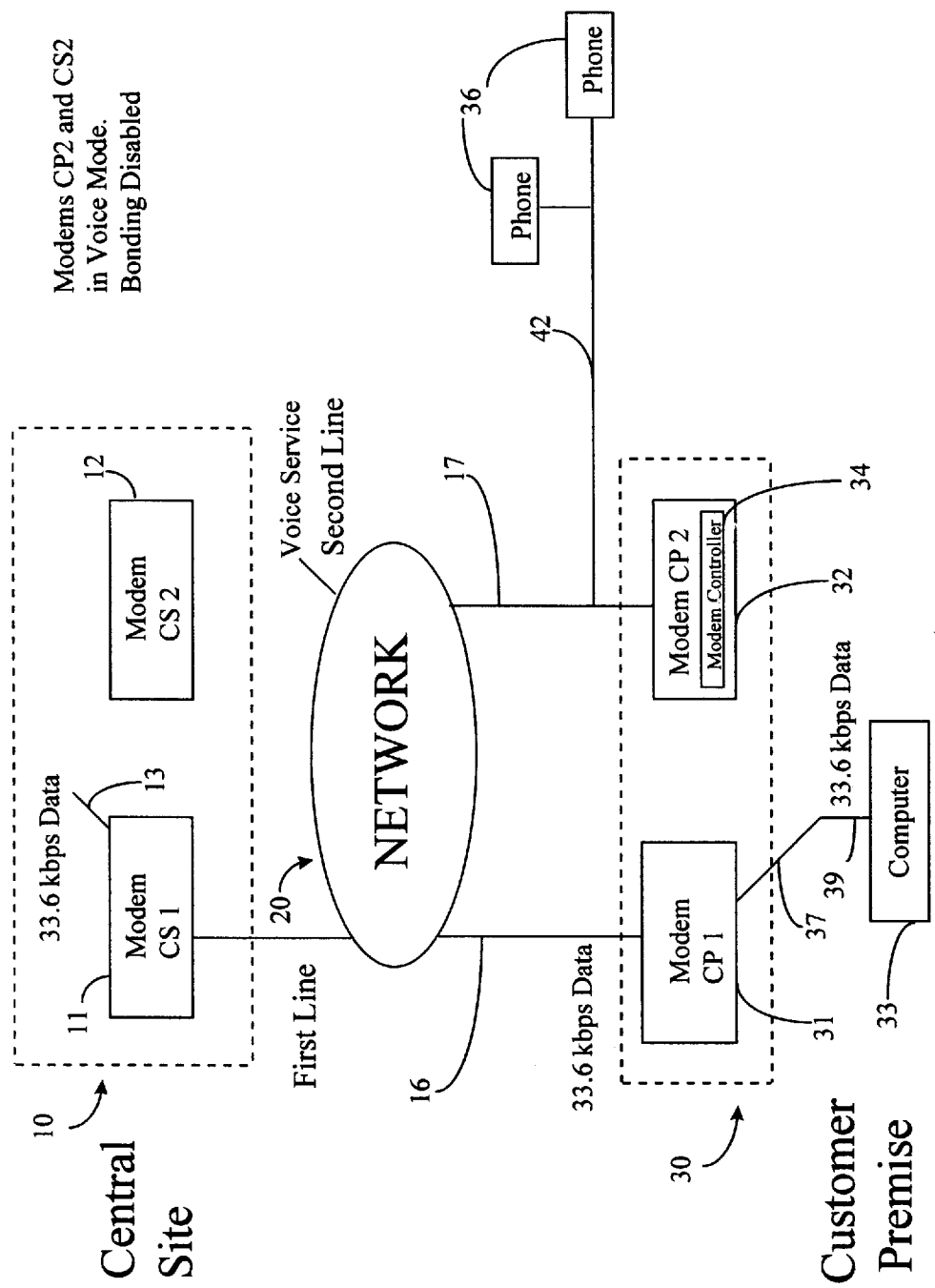
FIG. 2 is a schematic view of the multiple line modem and method of FIG. 1 with one line operating in data transfer mode and the other line operating in voice service mode.

FIG. 2 is a schematic view illustrating the multiple line modem and method of FIG. 1 in a typical network connection between a central site and a customer premise where first line 16 operates in data transfer mode and second line 17 operates in voice transfer mode. First CS modem 11 is connected to first line 16 through network 20 to first CP modem 31. Network 20 can be any public network including but not limited to for example, a public switched telephone network (PSTN) or public data network (PDN). First line 16 operates at a speed of approximately 33.6 kbps during data transfer operation. Modem 30 connects through line 37 to line 39 operating at approximately 33.6 kbps serving computer 33. While operating in this mode first line 16 is transporting data at a rate of approximately 33.6 kbps, while second line 17 is available for voice service. Connected to second CP modem 32 through line 42 are residential telephones 36 which are allowed to communicate through network 20 using ordinary telephony service when second CP modem 32 detects a request for telephone service. Within second CP modem 32 resides modem controller 34 which provides the adaptive switching capability that enables second line 17 to switch between data transfer mode and voice transfer mode. Modem controller 34 will be discussed in detail in the section entitled Modem Controller.

3. Modem Controller

Figure 3:
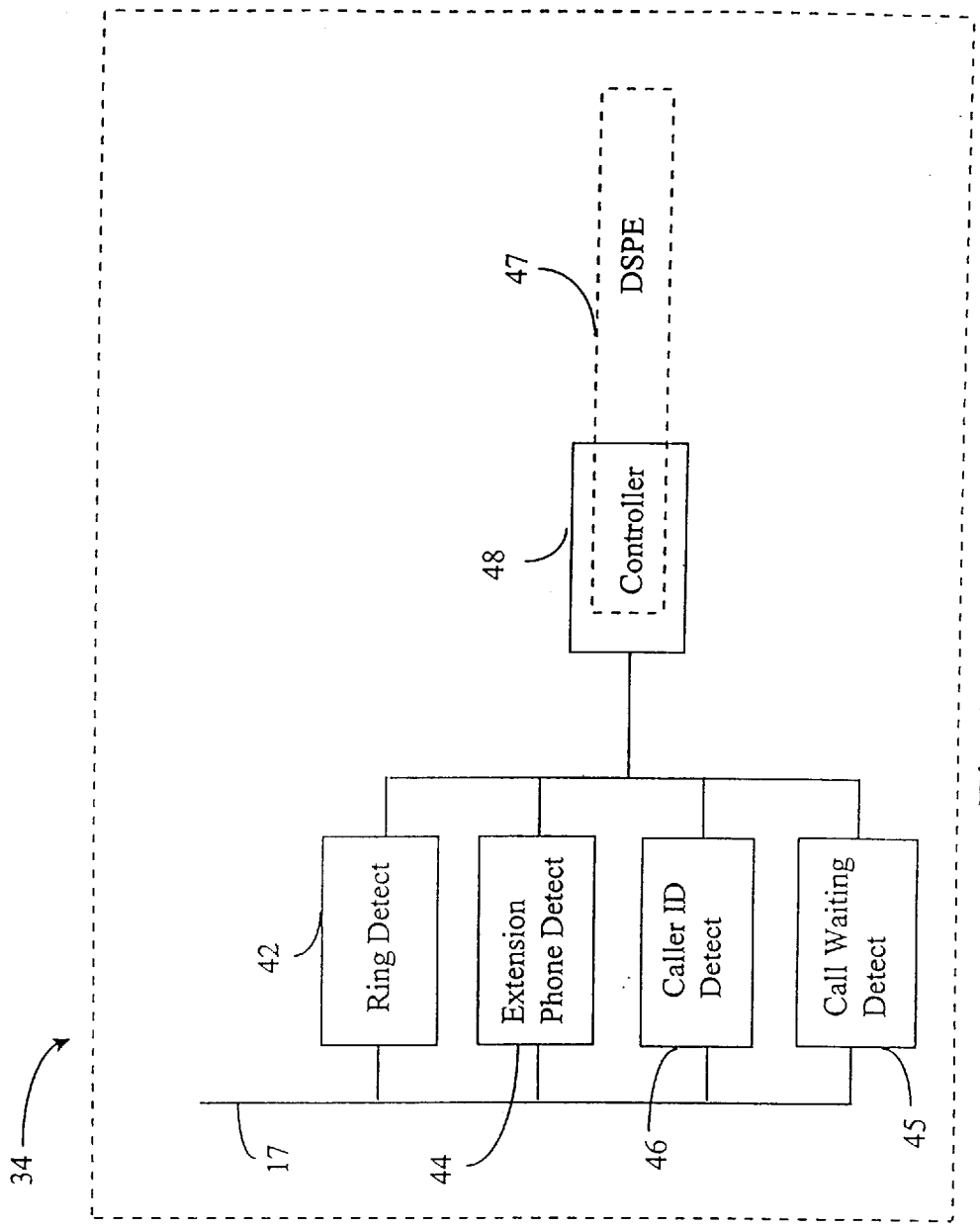
FIG. 3 is a schematic view of the modem controller illustrated in FIGS. 1 and 2.

Referring now to FIG. 3, a schematic view of the modem controller 34 is shown. Ring detector 42 contains logic designed to sense an incoming call on second line 17. Extension phone detect 44 contains logic designed to sense when the handset of a residential telephone 36 connected to second CP modem 32 through line 42 is lifted. Caller ID detect 46 contains logic designed to detect the origination phone number of an incoming call on second line 17. Call waiting detect 45 contains logic designed to detect a call waiting signal. When ring detector 42, extension phone detector 44, caller ID detector 46 or call waiting detect 45 is activated by a signal on second line 17 indicating a request for voice service, a voice service request signal will be sent to controller 48. Controller 48 can be a separate microprocessor such as a Motorola MC68302 or it can be an embedded Digital Signal Processing Engine (DSPE) 47 within controller 48. DSPE 47 and modem controller 48 contain logic designed to adaptively switch second line 17 from data transfer mode to voice service mode when a voice service request signal is received from extension phone detector 44, caller ID detector 46, or call waiting detector 45.

B. OPERATION

Figure 4A:
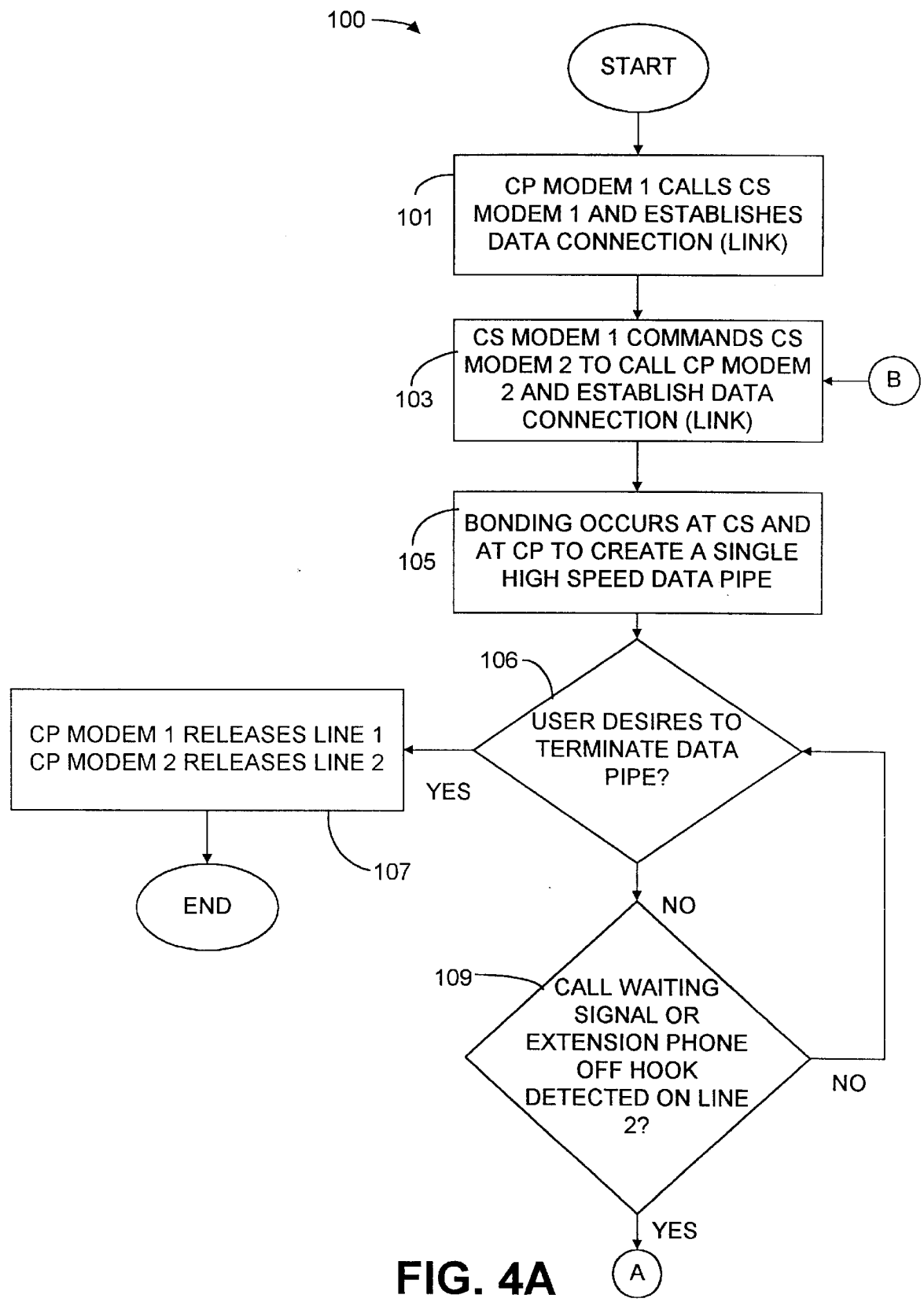
FIG. 4 is a flow chart illustrating the operation of the multiple line modem and method of FIGS. 1 and 2.
Figure 4B:
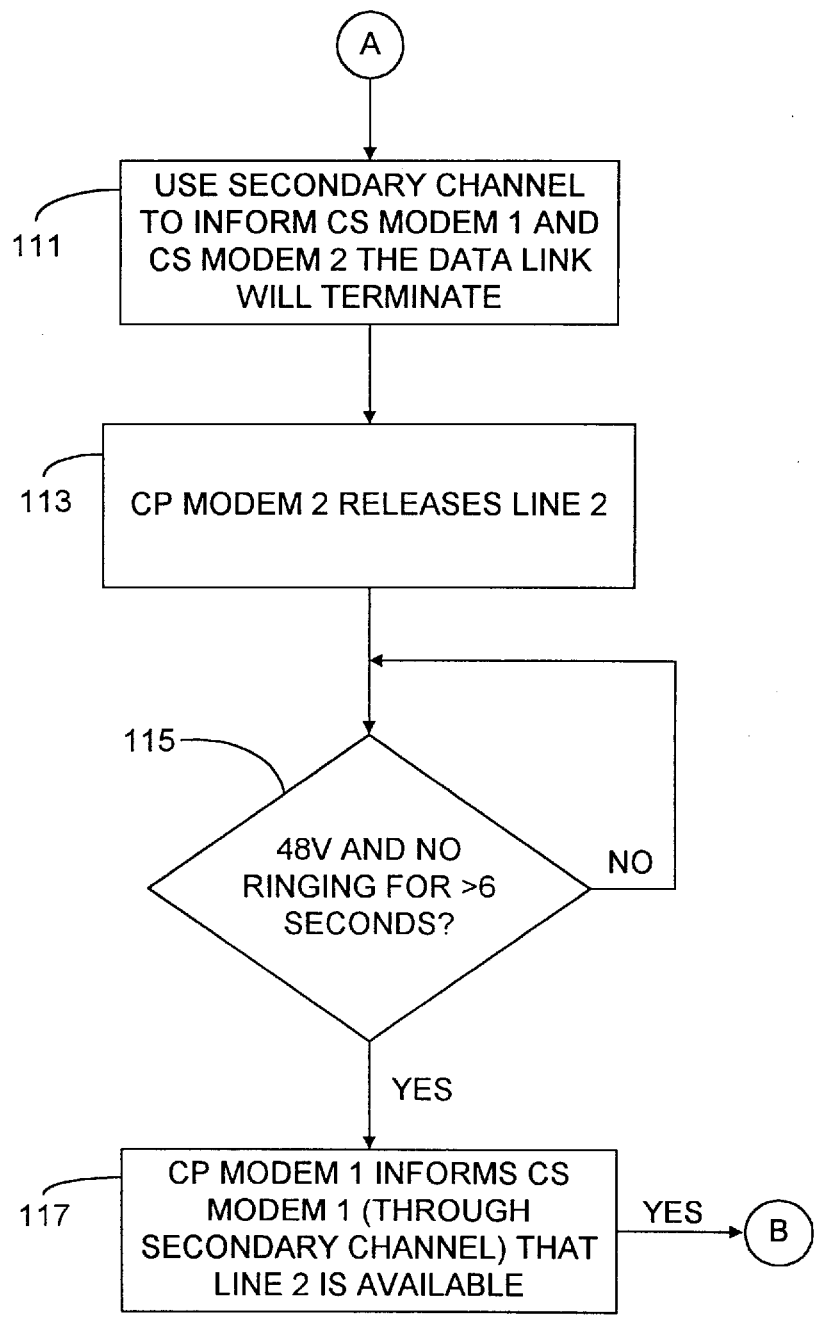

FIG. 4 is a view of a flowchart 100 illustrating the operation of the multiple line modem and method of FIGS. 1, 2 and 4. When data service is desired, first CP modem 31 calls first CS modem 11 and establishes a data connection on first line 16 as shown in block 101. This establishes a first line 16 connection for transporting data operating at a speed of approximately 33.6 kbps. At this time first CS modem 11 commands second CS modem 12 to call second CP modem 32 in order to establish a second data connection on second line 17. This establishes a second line 17 connection for transporting data operating at a speed of approximately 33.6 kbps as shown in block 103. First line 16 and second line 17 are each now operating in data transfer mode and are bonded providing an aggregate data connection on line 39 to computer 33 at a speed of approximately 67.2 kbps as shown in block 105.

First line 16 and second line 17 continue to operate in this data transfer mode until either the user decides to terminate the data connection as shown in block 106 where block 107 depicts first CP modem 31 releasing first line 16 and second CP modem 32 releasing second line 17, or a call waiting detect 45, or the lifting of a handset of a residential telephone 36 is detected by extension phone detector 44 as shown in block 109. A call waiting signal indicates an incoming telephone call on second line 17, and a lifted handset of a residential telephone 36 indicates that outgoing voice service is being requested on second line 17.

If a request for either incoming or outgoing voice service is detected it is sent to controller 48. Controller 48 uses an embedded secondary channel to inform first CS modem 11 and second CS modem 12 that the data link on second line 17 will terminate, as shown in block 111. This secondary channel can be implemented in a number of ways. For example, as is known in the art, a secondary channel can be provided by multiplexing the data modulated signal with another control signal according to for example ITU V.24; or a secondary channel can be provided as described in the commonly assigned, U.S. patent application of Bremer et al. entitled "Side-Channel Communications in Simultaneous Voice and Data Transmission," Ser. No. 08/151686, filed on Nov. 15, 1993, now U.S. Pat. No. 5,506,866 issued Apr. 9, 1996 the disclosure of which is incorporated herein by reference as if set forth in full hereinbelow. Controller 48 commands second CP modem 32 to release second line 17 from data transfer mode as shown in block 113 allowing uninterrupted data service at a reduced rate on first line 16.

Referring back to FIG. 2, second line 17 is available to the residential telephones 36 for voice service, while first line 16 remains in service in data transfer mode continuing to operate at approximately 33.6 kbps. Computer 33 now receives data on line 39 at a reduced speed of approximately 33.6 kbps. Central site modem 10 and customer premise modem 30 continue to operate in this mode until 48 VDC and no ringing for more than 6 seconds is detected by controller 48 on second line 17 as shown in block 115. Once 48 VDC and no ringing for more than 6 seconds is detected by controller 48 on second line 17, controller 48 will command first CP modem 31 to inform first CS modem 11 that second line 17 is again available for data transfer as shown in block 117. First CS modem 11 now commands second CS modem 12 to call second CP modem 32 and reestablish the second data connection on second line 17 as shown in block 103, thus restoring an aggregate data transfer speed of approximately 67.2 kbps. The bonding function can be accomplished in, among other places, the modem, the computer, or in an external device.

It will be obvious to those skilled in the art that many modifications and variations may be made to the preferred embodiments of the present invention, as set forth above, without departing substantially from the principles of the present invention. For example, but not limited to the following, it is possible to implement the present invention in a single telephone device, or provide the adaptive switching feature of the second modem in a distinct second modem added at a user site that has an existing conventional modem, or a combination of the two, while still practicing the concepts of the invention, as set forth previously. All such modifications and variations are intended to be included herein within the scope of the present invention, as defined in the claims that follow.

In the claims set forth hereinafter, the structures, materials, acts, and equivalents of all "means" elements and "logic" elements are intended to include any structures, materials, or acts for performing the functions specified in connection with said elements.

The following is claimed:

1. A method for increasing the data transfer rate of a data connection, comprising the steps of:
    providing a plurality of individual serial data lines;
    operating each of said plurality of individual serial data lines in a data transfer mode during a period in which voice service is not requested;
    operating at least one of said plurality of individual serial data lines in a voice service mode when voice service is requested, while continuing to operate a remainder of said plurality of individual serial data lines in said data transfer mode and redirecting data that would otherwise be transferred over the at least one serial data line operating in voice service mode to at least one of the remaining serial data lines; and
    returning said at least one of said plurality of individual serial data lines to said data service mode from said voice service mode when said voice service is complete and redistributing the transfer of data across each of the plurality of serial data lines.

2. The method of claim 1, wherein said plurality of individual serial data lines are telephone lines.

3. The method of claim 1, wherein said step of operating each of said plurality of individual serial data lines in said data transfer mode allows the transmission of data at an aggregate rate equal to the sum of the data rates of individual serial data lines.

4. A method for adaptively managing a plurality of individual serial data lines to allow the simultaneous transmission of data and voice, comprising the steps of:
    operating each of said plurality of individual serial data lines in a data transfer mode during a period in which voice service is not requested; and
    operating at least one of said plurality of individual serial data lines in a voice service mode when voice service is requested, while operating a remainder of said plurality of individual serial data lines in a data transfer mode and redirecting data that would otherwise be transferred over the at least one serial data line operating in voice service mode to at least one of the remaining serial data lines.

5. The method of claim 4, further comprising the step of:
    adaptively switching at least one of said plurality of individual serial data lines between data transfer mode operation and voice service mode operation thereby allowing the transition to a lower aggregate data rate while simultaneously maintaining data transfer mode operation on remainder of said plurality of individual serial data lines, and voice service mode operation on said at least one of said plurality of individual serial data lines.

6. The method of claim 5, further comprising the step of performing said adaptive switching when incoming voice service is requested.

7. The method of claim 5, further comprising the step of performing said adaptive switching when a request for outgoing voice service is detected by the lifting of a handset of a telephone.

8. A system for increasing the data transfer rate of a data connection, the system comprising:
    a plurality of individual serial data lines;
    a first means for operating each of said plurality of individual serial data lines in a data transfer mode during a period in which voice service is not requested;
    a second means for operating at least one of said plurality of individual serial data lines in a voice service mode when voice service is requested, while continuing to operate a remainder of said plurality of individual serial data lines in said data transfer mode and redirecting data that would otherwise be transferred over the at least one serial data line operating in voice service mode to at least one of the remaining serial data lines; and
    a third means for returning said at least one of said plurality of individual serial data lines to said data service mode from said voice service mode when said voice service is complete and redistributing the transfer of data across each of the plurality of serial data lines.

9. The system of claim 8, wherein said first means for operating each of said plurality of individual serial data lines in said data transfer mode allows the transmission of data at an aggregate rate equal to the sum of the data rates of individual serial data lines.

10. A system for adaptively managing a plurality of individual serial data lines to allow the simultaneous transmission of data and voice, the system comprising:
    a first means for operating each of a plurality of individual serial data lines in a data transfer mode during a period in which voice service is not requested; and a second means for operating at least one of said plurality of individual serial data lines in a voice service mode when voice service is requested, while operating the remainder of said plurality of individual serial data lines in a data transfer mode and redirecting data that would otherwise be transferred over the at least one serial data line operating in voice service mode to at least one of the remaining serial data lines.

11. The system of claim 10, further comprising:

switching means for adaptively switching at least one of said plurality of individual serial data lines between data transfer mode operation and voice service mode operation thereby allowing the transition to a lower aggregate data rate, while simultaneously maintaining data transfer mode operation on remainder of said plurality of individual serial data lines and voice service mode operation on said at least one of said plurality of individual serial data lines.

12. The system of claim 11, wherein said switching means performs said adaptive switching when incoming voice service is requested.

13. The system of claim 11, wherein said switching means performs said adaptive switching when a request for outgoing voice service is detected by the lifting of a handset of a telephone.

14. A computer-readable medium having a program for adaptively switching a modem between data transfer mode and voice service mode, the program comprising:

means for operating a plurality of individual serial data lines in a data transfer mode during a period in which voice service is not requested; and means for operating at least one of said plurality of individual serial data lines in a voice service mode when voice service is requested, while operating a remainder of said plurality of individual serial data lines in a voice service mode and redirecting data that would otherwise be transferred over the at least one serial data line operating in voice service mode to at least one of the remaining serial data lines.

15. A computer readable storage medium containing program code for execution on a computer system disposed for data communication over a plurality of serial data lines at a customer premises, the program code configured for managing the transmission of voice and data over the plurality of serial data lines comprising:

a first code segment for detecting the presence of a voice service mode on at least one of the serial data lines;

a second code segment for controlling the communication of data across the plurality of serial data lines when no voice service mode is detected by the first code segment, the first code segment being configured to distribute the communication of data across each of the plurality of serial data lines; and a second code segment for controlling the communication of data across the plurality of serial data lines when a voice service mode is detected by the first code segment, the second code segment being configured to inhibit the communication of data across at least one of the serial data lines, and instead redirect the communication of data that would otherwise be communicated across the at least one inhibited serial data line to at least one of the remaining serial data lines.

16. The computer readable storage medium as defined in claim 15, wherein the voice service mode is defined by at least one of the conditions selected from the group consisting of: an Off-Hook condition, and the reception of an incoming Call-Waiting signal.

17. A method for controlling data communication over a plurality of serial data lines including at least one voice-capable line at a customer premises, comprising the steps of:

(a) detecting the existence of a voice service mode;

(b) transmitting data across each of the plurality of serial data lines in a fully distributed fashion, when no voice service mode is detected; and (c) inhibiting the transmission of data across the at least one voice-capable line and redirecting data otherwise disposed for transmission across the at least one voice-capable line for communication across the remaining serial data lines, when a voice service mode is detected.

* * * * *

UNITED STATES PATENT AND TRADEMARK OFFICE
CERTIFICATE OF CORRECTION

PATENT : 5,841,840

DATED : Nov. 24, 1998

INVENTOR(S) : Smith et al.

It is certified that error appears in the above-identified patent and that said Letters Patent is hereby corrected as shown below:

On the title page:

Under "References Cited" heading, add the following U.S. Patent Document:

5,506,866    4/1996   Bremer et al. ................375/216 and Under "Other Patent Publications" add the following:

Marketing Material from Diamond Multimedia, "Shotgun Technology,"
    © 1997 Diamond Multimedia Systems, Inc., pp. 1-2.

Marketing Material from Diamond Multimedia, "Shotgun Technology and
    Dual Line Modems - White Papers," © 1997 Diamond Multimedia Systems,
    Inc., pp. 1-6.

Marketing Material from Diamond Multimedia, "Diamond Doubles Modem Speed,"
    © 1997 Diamond Multimedia Systems, Inc., pp. 1-3

UNITED STATES PATENT AND TRADEMARK OFFICE
CERTIFICATE OF CORRECTION

PATENT NO. : 5,841,840

DATED : Nov. 24, 1998

INVENTOR(S) : Smith et al.

It is certified that error appears in the above-identified patent and that said Letters Patent is hereby corrected as shown below:

Internet Engineering Task Force-Request for Comment (IETF-REC 1990) On PPP Multilink Protocol (MP), August 1996, pp. 1-41.

Signed and Sealed this

Fourth Day of May, 1999

Attest:

Q. TODD DICKINSON

Attesting Officer

Acting Commissioner of Patents and Trademarks